(12) United States Patent
Ando et al.

(10) Patent No.: US 11,982,464 B2
(45) Date of Patent: May 14, 2024

(54) AIR-CONDITIONING SYSTEM

(71) Applicant: Panasonic Intellectual Property Management Co., Ltd., Osaka (JP)

(72) Inventors: Koki Ando, Aichi (JP); Naoyuki Funada, Aichi (JP); Ayumi Konishi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 443 days.

(21) Appl. No.: 17/427,727

(22) PCT Filed: Feb. 7, 2020

(86) PCT No.: PCT/JP2020/004784
§ 371 (c)(1),
(2) Date: Aug. 2, 2021

(87) PCT Pub. No.: WO2020/166503
PCT Pub. Date: Aug. 20, 2020

(65) Prior Publication Data
US 2022/0113044 A1 Apr. 14, 2022

(30) Foreign Application Priority Data
Feb. 15, 2019 (JP) .................. 2019-025295

(51) Int. Cl.
*F24F 7/007* (2006.01)
*F24F 11/00* (2018.01)

(52) U.S. Cl.
CPC .......... *F24F 7/007* (2013.01); *F24F 11/0001* (2013.01)

(58) Field of Classification Search
CPC .............................. F24F 7/007; F24F 11/0001
(Continued)

(56) References Cited

U.S. PATENT DOCUMENTS 2,277,247 A * 3/1942 Morse ................. F28D 1/024
165/125
6,021,953 A * 2/2000 Swan ................. F24F 11/0001
236/44 A
(Continued)

FOREIGN PATENT DOCUMENTS

JP H08-094123 A 4/1996
JP 2011-127845 A 6/2011
(Continued)

OTHER PUBLICATIONS

Tjernlund Products, Airshare Transfer Fans, Mar. 14, 2015; https://web.archive.org/web/20150314234528/http:/tjernlund.com/airshare_ventilation.htm (Year: 2015).*
(Continued)

*Primary Examiner* — Avinash A Savani
*Assistant Examiner* — Dana K Tighe
(74) *Attorney, Agent, or Firm* — Renner, Otto, Boisselle & Sklar, LLP

(57) ABSTRACT

Provided is an air-conditioning system that air-conditions a house having an upper floor and a lower floor positioned at a lower position than the upper floor. The air-conditioning system includes an air-conditioning apparatus that conditions air in an air-conditioning room provided at the upper floor or at a higher position than the upper floor, a plurality of conveyance fans that conveys the air in the air-conditioning room to a plurality of upper rooms positioned at the higher floor independent of the air condition room, and is provided to correspond to the plurality of upper rooms, coupling fans that couple the upper rooms and lower rooms positioned at lower positions of the upper rooms to blow air from the upper rooms to the lower rooms, and a system controller that controls the air-conditioning apparatus, the conveyance fans, and the coupling fans.

8 Claims, 10 Drawing Sheets

(58) Field of Classification Search
USPC .................................................. 454/226, 909
See application file for complete search history.

(56) References Cited

U.S. PATENT DOCUMENTS

| | | | | |
|---|---|---|---|---|
| 6,319,115 | B1* | 11/2001 | Shingaki | F24F 12/006 |
| | | | | 165/909 |
| 7,250,000 | B2* | 7/2007 | Daniels, II | E04D 12/004 |
| | | | | 454/250 |
| 7,966,837 | B2* | 6/2011 | El-Galley | F24F 1/00075 |
| | | | | 62/177 |
| 8,079,898 | B1* | 12/2011 | Stevenson | F24F 13/0218 |
| | | | | 55/306 |
| 8,118,236 | B2* | 2/2012 | Lestage | F24F 11/0001 |
| | | | | 454/343 |
| 2010/0163633 | A1* | 7/2010 | Barrett | F24H 9/2064 |
| | | | | 236/51 |
| 2015/0330657 | A1* | 11/2015 | Kates | F24F 11/76 |
| | | | | 236/51 |
| 2016/0054016 | A1* | 2/2016 | Takahashi | F24F 11/46 |
| | | | | 454/258 |
| 2017/0350610 | A1* | 12/2017 | Michielsen | F24F 11/56 |

FOREIGN PATENT DOCUMENTS

| | | | |
|---|---|---|---|
| JP | 2011-174674 A | | 9/2011 |
| JP | 2017-194242 A | | 10/2017 |
| JP | 2018-155444 A | | 10/2018 |
| WO | WO-2015068277 A1 | * | 5/2015 ............. F24F 11/30 |

OTHER PUBLICATIONS

International Search Report for corresponding Application No. PCT/JP2020/004784, mailed Apr. 14, 2020.

\* cited by examiner

FIG. 2
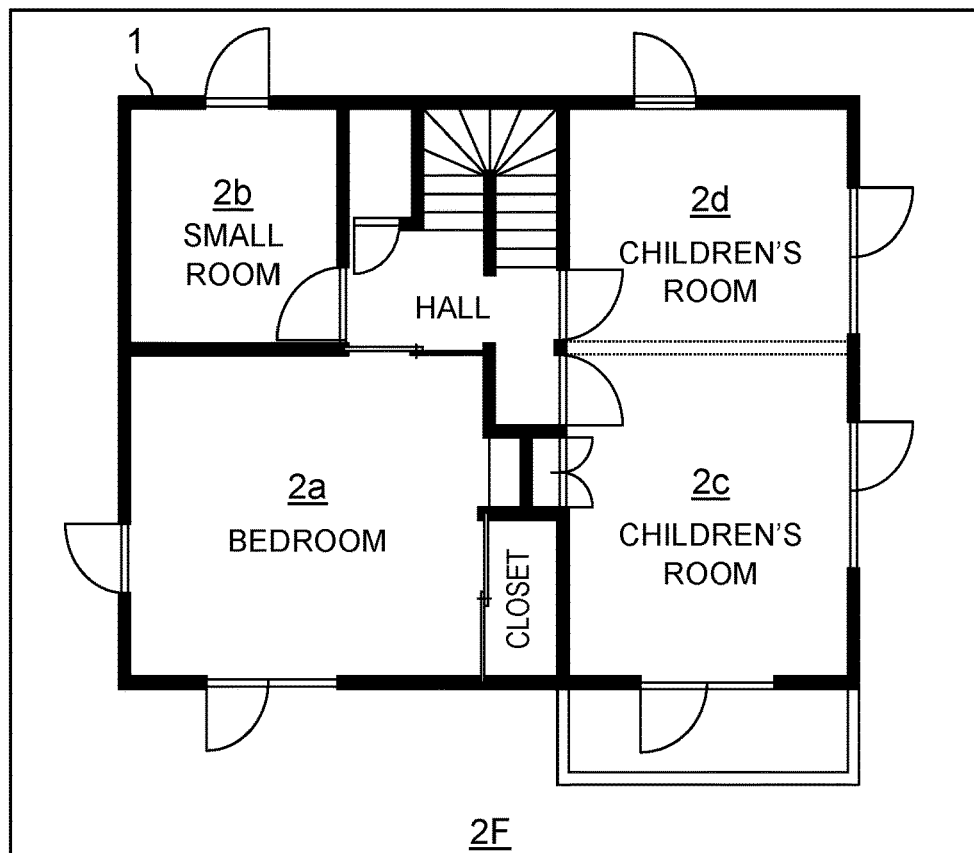
2F
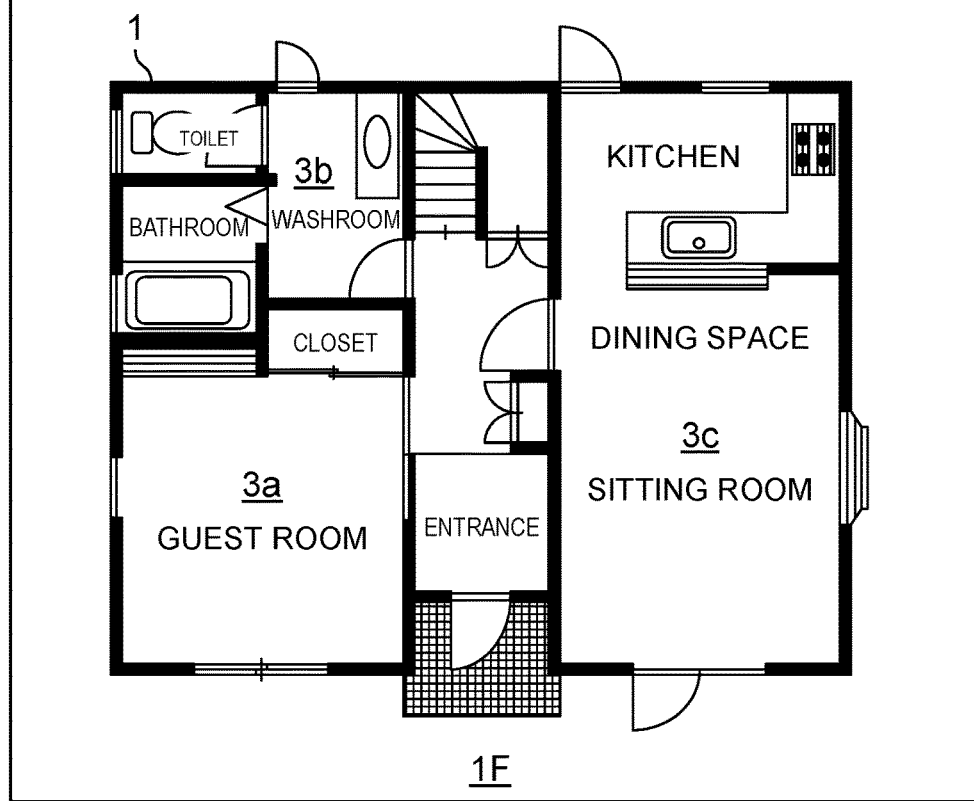
1F

AIR-CONDITIONING SYSTEM

TECHNICAL FIELD

The present disclosure relates to an air-conditioning system.

BACKGROUND ART

In the related art, air-conditioning has been performed on a residence in an entire building air-conditioning apparatus. It is predicted that high-heat-insulating and high-airtight residential buildings will increase along with an increase in demand for energy-saving residential buildings and reinforcement of regulations, and there is a demand for an air-conditioning system suitable for the characteristics thereof.

For example, as disclosed in PTL 1, in a high-heat-insulating and high-airtight house including a plurality of rooms, an air-conditioning apparatus is independently provided, and air supply ducts that couple an air-conditioning room and the rooms are provided. A method for individually distributing and supplying air in the air-conditioning room by a controller disposed in each room has been known.

CITATION LIST

Patent Literature

PTL 1: Unexamined Japanese Patent Publication No. 2011-127845

SUMMARY OF THE INVENTION

In such an air-conditioning system of the related art, it is necessary to couple pipes (ducts) from the air-conditioning room to the rooms. However, in a so-called unit method in a broad sense for preparing a plurality of types of common parts such as a floor, an outer wall, an inner wall, and a ceiling in advance and assembling a house by a combination of the plurality of common parts, the laying of pipes for all rooms is inefficient. That is, when the pipes are laid for all the parts, there are a large number of unnecessary spaces through which the pipes do not pass in the house, and thus, space efficiency deteriorates. When the pipes are laid for only some parts, the types of the parts increase, and the advantage of the unit method is impaired. These problems particularly arise when the pipes are laid between an upper floor (for example, a second floor) and a lower floor (for example, a first floor).

Therefore, the present disclosure has been made in order to solve the above-described problems of the related art, and an object of the present disclosure is to provide an air-conditioning system that solves a problem of laying pipes between an upper floor and a lower floor.

In order to achieve the object, the present disclosure is an air-conditioning system that air-conditions a house having an upper floor and a lower floor positioned at a lower position than the upper floor. The air-conditioning system includes an air-conditioning apparatus that conditions air in an air-conditioning room provided at the upper floor or at a higher position than the upper floor, a plurality of conveyance fans that conveys the air in the air-conditioning room to a plurality of upper rooms positioned at the higher floor independent of the air condition room, and is provided to correspond to the plurality of upper rooms, coupling fans that couple the plurality of upper rooms and a lower room positioned at a lower position of the plurality of upper rooms to blow air from the plurality of upper rooms to the lower room, and a system controller that controls the air-conditioning apparatus, the conveyance fans, and the coupling fans. Accordingly, an expected object is achieved.

According to the present disclosure, it is possible to provide an air-conditioning system capable of efficiently blowing air between an upper floor and a lower floor.

BRIEF DESCRIPTION OF DRAWINGS

FIG. 2 is a diagram illustrating an example of room arrangement of a house according to the first exemplary embodiment of the present disclosure.

DESCRIPTION OF EMBODIMENT

Hereinafter, an exemplary embodiment of the present disclosure will be described with reference to the accompanying drawings. The following exemplary embodiment illustrates a preferred specific example of the present disclosure. Thus, numerical values, shapes, materials, components, arranged positions and connection forms of the components, steps (processes), orders of steps, and the like to be illustrated in the following exemplary embodiment are examples and are not to limit the scope of the present disclosure. Accordingly, among the components in the following exemplary embodiment, the components that are not recited in the independent claims representing the most superordinate concept of the present disclosure are described herein as optional components. In each drawing, substantially the same components are denoted by the same reference marks, and the redundant description will be omitted or simplified.

First Exemplary Embodiment

Figure 1:
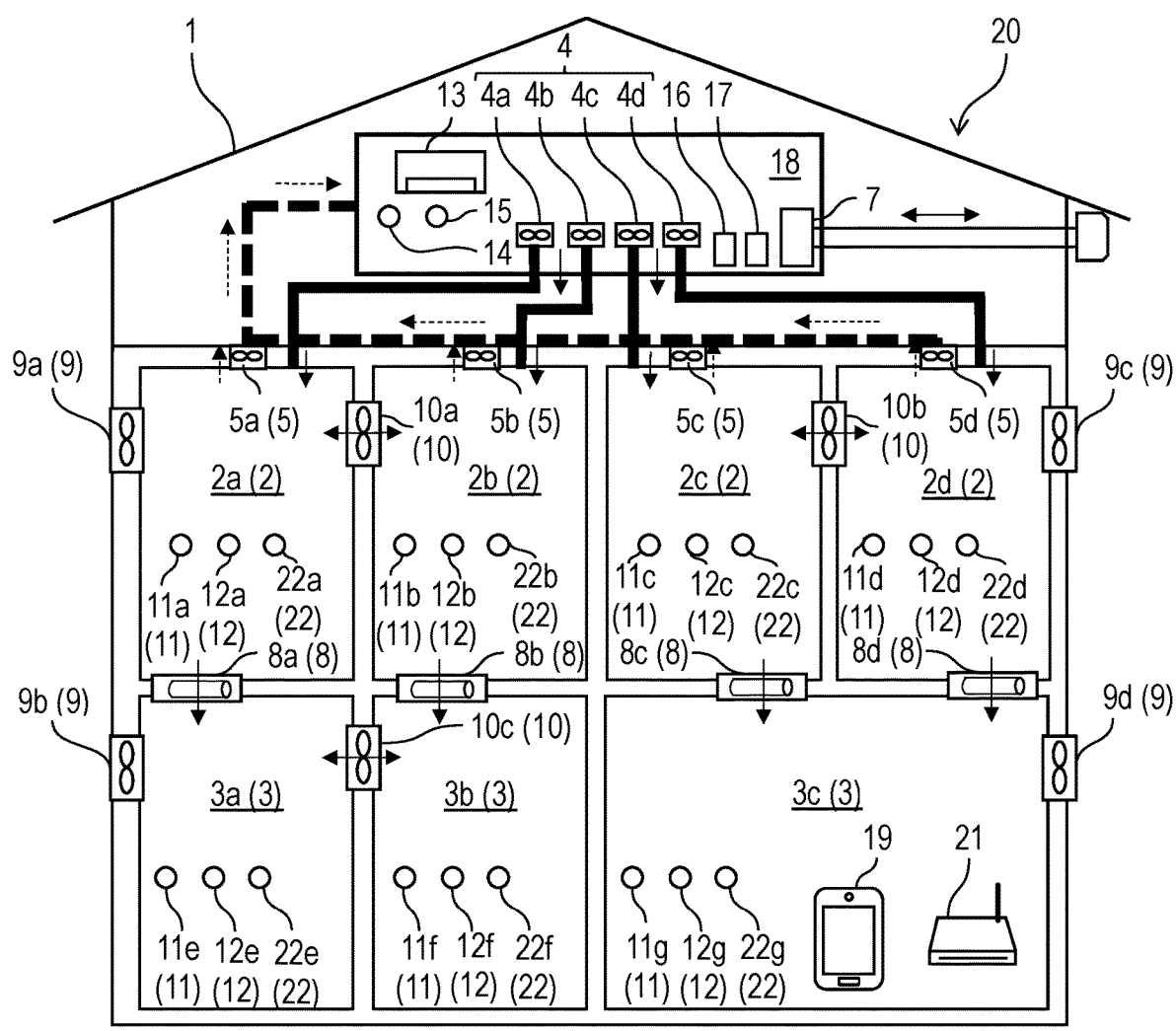
FIG. 1 is a connection schematic diagram of an air-conditioning system according to a first exemplary embodiment of the present disclosure.

First, air-conditioning system 20 according to a first exemplary embodiment of the present disclosure will be described with reference to FIGS. 1 and 2. FIG. 1 is a connection schematic diagram of air-conditioning system 20 according to the present exemplary embodiment, and FIG. 2 is a diagram illustrating an example of a room arrangement of house 1 according to the present exemplary embodiment.

Air-conditioning system 20 is applicable to, for example, house 1 as a general residential building having a second floor and a first floor positioned lower than the second floor.

House 1 includes, for example, four upper rooms 2 (upper rooms 2a to 2d) on the second floor corresponding to an upper floor, three lower rooms 3 (lower rooms 3a to 3c) on the first floor corresponding to a lower floor, and at least one air-conditioning room 18 independent of the rooms, that is, upper rooms 2 and lower rooms 3 in an attic positioned at a higher position than the second floor. Here, house 1 is a residence or a residential building provided as a place where residents have a private life, and as a general configuration, the room includes a living room (sitting room), a dining room (kitchen+dining space), a bedroom, a private room, a children's room, and the like. The rooms provided by air-conditioning system 20 may include a toilet, a bathroom, a washroom, a dressing room, and the like.

FIG. 1 is a two-dimensional representation for a simple view, and a corridor, a staircase, and the like are not clearly shown, but a hierarchical relationship between the rooms has the following relationship as illustrated in FIG. 2. That is, lower room 3a is positioned below upper room 2a. Lower room 3b is positioned below upper room 2b. Lower room 3c is positioned below upper room 2c and upper room 2d. For the sake of understanding, when upper rooms 2 and lower rooms 3, that is, the rooms are applied to an actual house, for example, upper room 2a corresponds to a bedroom, upper room 2b corresponds to a small room such as a storage room, and upper room 2c and upper room 2d correspond to private rooms as children's rooms. Lower room 3a corresponds to a private room as a guest room, lower room 3b corresponds to a washroom and a toilet, and lower room 3c corresponds to a so-called living-dining room in which a kitchen, a dining room, and a sitting room are provided as one space.

Air-conditioning system 20 includes outside air introduction fan 7, a plurality of conveyance fans 4 (conveyance fans 4a, 4b, 4c, and 4d), a plurality of circulation fans 5 (circulation fans 5a, 5b, 5c, and 5d), a plurality of coupling fans 8 (coupling fans 8a, 8b, 8c, and 8d), a plurality of discharge fans 9 (discharge fans 9a, 9b, 9c, and 9d), and a plurality of air blowing fans 10 (air blowing fans 10a, 10b, and 10c).

Air-conditioning system 20 further includes room temperature sensors 11 (room temperature sensors 11a, 11b, 11c, 11d, 11e, 11f, and 11g), room humidity sensors 12 (room humidity sensors 12a, 12b, 12c, 12d, 12e, 12f, and 12g), air quality sensors 22 (air quality sensors 22a, 22b, 22c, 22d, 22e, 22f, and 22g), air-conditioning room temperature sensor 14, air-conditioning room humidity sensor 15, air conditioner 13, humidifier 16, dehumidifier 17, input and output terminal 19, and system controller 21 (corresponding to an air-conditioning system controller).

In air-conditioning room 18, air conveyed from upper rooms 2 is mixed. Outside air is taken into air-conditioning room 18 by outside air introduction fans 7 and is mixed with the air conveyed from upper rooms 2 by circulation fans 5. Air to be conveyed to upper rooms 2 is generated by controlling a temperature and a humidity of the air in air-conditioning room 18 by air conditioner 13, humidifier 16, and dehumidifier 17 provided in air-conditioning room 18, that is, conditioning the air. The air conditioned in air-conditioning room 18 is conveyed to upper rooms 2 by conveyance fans 4.

The air in upper rooms 2 is conveyed to air-conditioning room 18 by circulation fans 5, and is discharged as outside air from the insides of rooms 6 to the outside of house 1 by discharge fans 9. Air-conditioning system 20 discharges the outside air from the insides of the rooms by controlling air discharge volumes of discharge fans 9, and takes the outside air into the rooms by controlling an air supply volume of outside air introduction fan 7 by the linkage with the air discharge volumes of discharge fans 9. In this manner, the air-conditioning system performs ventilation by a first type ventilation method.

Outside air introduction fan 7 is a fan that takes the outside air into the rooms of general house 1, and corresponds to an air supply function of an air supply fan or a heat exchange air fan. As described above, the outside air taken in by outside air introduction fan 7 is introduced into air-conditioning room 18. The air supply volume of outside air introduction fan 7 can be set in a plurality of stages, and when outside air introduction fan 7 is a heat exchange air fan, an air discharge volume during a heat exchange air stirring operation is set in accordance with the air discharge volumes of discharge fans 9 as will be described later.

Discharge fans 9 are fans that discharge, as the outside air, a part of the air in corresponding room 6, via, for example, a discharge duct, and correspond to discharge functions of a ceiling embedded ventilation fan, a wall mounted ventilation fan, a range hood, and a heat exchange air fan. In FIG. 1, discharge fans 9 are directly connected to the outside of house 1. However, when the discharge function of the heat exchange air fan is used, the discharge duct connected to discharge fans 9 is once connected to the heat exchange air fan and is then connected to the outside of house 1. That is, the air passing through the discharge duct is heat-exchanged with the air passing through an air supply duct of the heat exchange air fan, and is then discharged to the outside of house 1. Discharge fan 9a is provided in upper room 2a, discharge fan 9b is provided in lower room 3a, discharge fan 9c is provided in upper room 2d, and discharge fan 9d is provided in lower room 3c. However, the rooms to which discharge fans 9 are connected are examples, and the discharge fans may be provided in other rooms based on the arrangement and necessity of rooms 6 of house 1.

Discharge fans 9 are configured such that the air discharge volumes can be set in a plurality of levels. Normally, discharge fans 9 are controlled so as to have preset air discharge volumes. The air discharge volume is controlled for each of discharge fans 9a to 9d in accordance with settings by a user and values acquired by various sensors.

Conveyance fans 4a to 4d are provided on, for example, a wall surface in air-conditioning room 18 so as to correspond to upper rooms 2a to 2d. The air in air-conditioning room 18 is conveyed to upper room 2a by conveyance fan 4a via a conveyance duct, is conveyed to upper room 2b by conveyance fan 4b via a conveyance duct, is conveyed to upper room 2c by conveyance fan 4c via a conveyance duct, and is conveyed to upper room 2d by conveyance fan 4d via a conveyance duct. The conveyance ducts connected to upper rooms 2 are provided independently of each other.

Circulation fans 5 are provided on, for example, ceilings of upper rooms 2, and blow a part of the air in upper rooms 2 to air-conditioning room 18 via circulation ducts. Circulation fan 5a is provided in upper room 2a, circulation fan 5b is provided in upper room 2b, circulation fan 5c is provided in upper room 2c, and circulation fan 5d is provided in upper room 2d. A part of the air in upper rooms 2a to 2d is conveyed to air-conditioning room 18 via the circulation ducts by corresponding circulation fans 5a to 6d, respectively. Although the circulation ducts that connect air-conditioning room 18 and upper rooms 2 may be provided independently of each other, one circulation duct may be integrated by merging a plurality of branch ducts that is a part of the circulation ducts at the middle, and may be connected to air-conditioning room 18. Circulation fans 5 and the circulation ducts are not necessarily required. That is, when natural circulation of the air in the rooms to air-conditioning room 18 or circulation to air-conditioning room 18 due to negative pressures of conveyance fans 4 is expected, for example, like a case where when air-conditioning room 18 is provided on an upper floor and further faces the corridor, it is not necessary to provide circulation fans 5 and the circulation ducts.

Coupling fans 8 are provided on floor surfaces of upper rooms 2, and blow the air in upper rooms 2, that is, a part of the air conditioned and conveyed via the air-conditioning room from upper rooms 2 to lower rooms 3 immediately below. Coupling fan 8a is disposed between an underfloor space of upper room 2a and a ceiling of lower room 3a. Coupling fan 8b is disposed between an underfloor space of upper room 2b and a ceiling of lower room 3b. Coupling fan 8c and Coupling fan 8d are disposed between underfloor spaces of upper room 2c and upper room 2d and a ceiling of lower room 3c, respectively.

Air blowing fans 10 are disposed in walls between the rooms on the same floor, and exchange the air between the rooms. Air blowing fan 10a corresponds to an upper-floor air blowing fan, and is disposed in the wall between upper room 2a and upper room 2b. Air blowing fan 10b corresponds to an upper-floor air blowing fan, and is disposed in the wall between upper room 2c and upper room 2d. Air blowing fan 10c corresponds to a lower-floor air blowing fan, and is disposed in the wall between lower room 3a and lower room 3b. In this drawing, air blowing between two rooms is schematically performed by one fan, but it is not necessary to perform the air blowing by one fan, and bidirectional air blowing may be achieved by using a plurality of fans. In the present exemplary embodiment, air blowing fans 10 are provided only between the rooms. However, for example, it is possible to promote the circulation of the air in house 1 by providing air blowing fans 10 between the rooms and a hall, between the rooms and stairs, between the rooms and an entrance, and the like illustrated in FIG. 2, or it is possible to achieve efficient air-conditioning by stopping blowing the air to unnecessary rooms and the like. The air volumes of air blowing fans 10 can be controlled by system controller 21.

Air conditioner 13 corresponds to an air-conditioning apparatus, and controls air-conditioning of air-conditioning room 18. Air conditioner 13 cools or heats the air in air-conditioning room 18 such that the temperature of the air in air-conditioning room 18 becomes a set target temperature (air-conditioning room target temperature).

When the humidity of the air in air-conditioning room 18 is lower than the set target humidity (air-conditioning room target humidity), humidifier 16 humidifies the air in air-conditioning room 18 such that the humidity becomes the air-conditioning room target humidity. Although humidifier 16 may be built in air conditioner 13, it is desirable to include humidifier 16 independent of air conditioner 13 in order to obtain humidification capacity corresponding to a plurality of rooms.

When the humidity of the air in air-conditioning room 18 is higher than the set target humidity (air-conditioning room target humidity), dehumidifier 17 dehumidifies the air in air-conditioning room 18 such that the humidity becomes the air-conditioning room target humidity. Although dehumidifier 17 may be built in air conditioner 13, it is desirable to include dehumidifier 17 independent of air conditioner 13 in order to obtain dehumidification capacity corresponding to a plurality of rooms.

Room temperature sensors 11 are sensors that acquire indoor temperatures of the corresponding rooms, and transmit the indoor temperatures to system controller 21. Room temperature sensor 11a is provided in upper room 2a, room temperature sensor 11b is provided in upper room 2b, room temperature sensor 11c is provided in upper room 2c, and room temperature sensor 11d is provided in upper room 2d. Room temperature sensor 11e is provided in lower room 3a, room temperature sensor 11f is provided in lower room 3b, and room temperature sensor 11g is provided in lower room 3c.

Room humidity sensors 12 are sensors that acquire room humidities of the corresponding rooms, and transmit the acquired room humidities to system controller 21. Room humidity sensor 12a is provided in upper room 2a, room humidity sensor 12b is provided in upper room 2b, room humidity sensor 12c is provided in upper room 2c, and room humidity sensor 12d is provided in upper room 2d. Room humidity sensor 12e is provided in lower room 3a, room humidity sensor 12f is provided in lower room 3b, and room humidity sensor 12g is provided in lower room 3c.

Air quality sensors 22 are sensors that acquire air quality of the corresponding rooms, and transmit the acquired air quality to system controller 21. Air quality sensor 22a is provided in upper room 2a, air quality sensor 22b is provided in upper room 2b, air quality sensor 22c is provided in upper room 2c, and air quality sensor 22d is provided in upper room 2d. Air quality sensor 22e is provided in lower room 3a, air quality sensor 22f is provided in lower room 3b, and air quality sensor 22g is provided in lower room 3c. Here, the air quality indicates the component amount of substances as gas components or dirt in the air that may adversely affect the human body when the component amount is more than or equal to a reference value. Specifically, carbon monoxide, carbon dioxide, dirt (PM 2.5 and the like), a causative substance of odor, a causative substance of sick building syndrome, total volatile organic compounds (TVOC), and the like are applicable.

Air conditioning room temperature sensor 14 is a sensor that acquires a temperature of the air in air-conditioning room 18, and transmits the temperature to system controller 21. Air-conditioning room temperature sensor 14 may be built in air conditioner 13. However, when the air-conditioning room temperature sensor is built in air conditioner 13, only information about surroundings of air conditioner 13 (for example, near an air supply port) can be obtained. Since the outside air and the air conveyed from the rooms are mixed as described above, it is desirable to include air-conditioning room 18 independently of air conditioner 13 so as to obtain information about entire air-conditioning room 18.

Air conditioning room humidity sensor 15 is a sensor that acquires the humidity of the air in air-conditioning room 18, and transmits the humidity to system controller 21. For the same reason as air-conditioning room temperature sensor 14, it is desirable to include air-conditioning room humidity sensor 15 independently of air conditioner 13 so as to obtain information about entire air-conditioning room 18.

System controller 21 is a controller that controls entire air-conditioning system 20. System controller 21 is connected to be able to communicate with outside air introduction fan 7, discharge fans 9, conveyance fans 4, circulation fans 5, room temperature sensors 11, room humidity sensors 12, air-conditioning room temperature sensor 14, air-conditioning room humidity sensor 15, air conditioner 13, humidifier 16, and dehumidifier 17 by wireless communication.

System controller 21 controls outside air introduction fan 7 and discharge fans 9 by the linkage with each other by, for example, setting the air supply volume of outside air introduction fan 7 so as to have an air volume corresponding to the air discharge volumes of discharge fans 9. Accordingly, house 1 is ventilated by the first type ventilation method.

System controller 21 controls air conditioner 13 as the air-conditioning apparatus, humidifier 16, and dehumidifier 17 such that at least one of the temperature and the humidity of air-conditioning room 18 becomes at least one of the air-conditioning room target temperature and the air-conditioning room target humidity set in air-conditioning room 18 based on the temperature and the humidity of the air in air-conditioning room 18 acquired by air-conditioning room temperature sensor 14 and air-conditioning room humidity sensor 15.

System controller 21 sets the air volumes of conveyance fans 4 and the air volumes of circulation fans 5 in accordance with at least one of the indoor temperatures and the indoor humidities of the rooms acquired by room temperature sensors 11 and room humidity sensors 12, at least one of the target temperatures (room target temperatures) and the target humidities (room target humidities) set for the rooms, and the like.

Accordingly, the air conditioned in air-conditioning room 18 is first conveyed to upper rooms 2 with the air volumes set for conveyance fans 4, and is further conveyed to lower rooms 3 corresponding to upper rooms 2 by operations of coupling fans 8. The air in upper rooms 2 is conveyed to air-conditioning room 18 with the air volumes set for circulation fans 5. Thus, at least one of the indoor temperatures and the indoor humidities of upper rooms 2 is controlled to be at least one of the room target temperatures and the room target humidities of upper rooms 2. Control is performed such that at least one of the indoor temperatures and the indoor humidities of lower room 3 becomes at least one of the room target temperatures and the room target humidities of lower rooms 3 or approaches the room target temperatures and the room target humidities of the lower rooms within a range of influence that can be given by air-conditioning (air) of corresponding upper rooms 2.

Here, system controller 21, outside air introduction fan 7, discharge fans 9, conveyance fans 4, circulation fans 5, room temperature sensors 11, room humidity sensors 12, air-conditioning room temperature sensor 14, air-conditioning room humidity sensor 15, air conditioner 13, humidifier 16, and dehumidifier 17 are connected by wireless communication, and thus, a complicated wiring construction can be eliminated. However, all these devices, or system controller 21 and a part of these devices may be configured to be able to communicate by wired communication.

Input and output terminal 19 is connected to be able to communicate with system controller 21 by wireless communication, receives an input of information necessary for constructing air-conditioning system 20, and stores the information in system controller 21, or acquires a state of air-conditioning system 20 from system controller 21 and displays the state. Examples of input and output terminal 19 include a mobile information terminal such as a mobile phone, a smartphone, and a tablet.

Input and output terminal 19 is not necessarily connected to system controller 21 by wireless communication, and may be connected to be able to communicate with system controller 21 by wired communication. In this case, input and output terminal 19 may be implemented by, for example, a remote controller on a wall.

Figure 3:
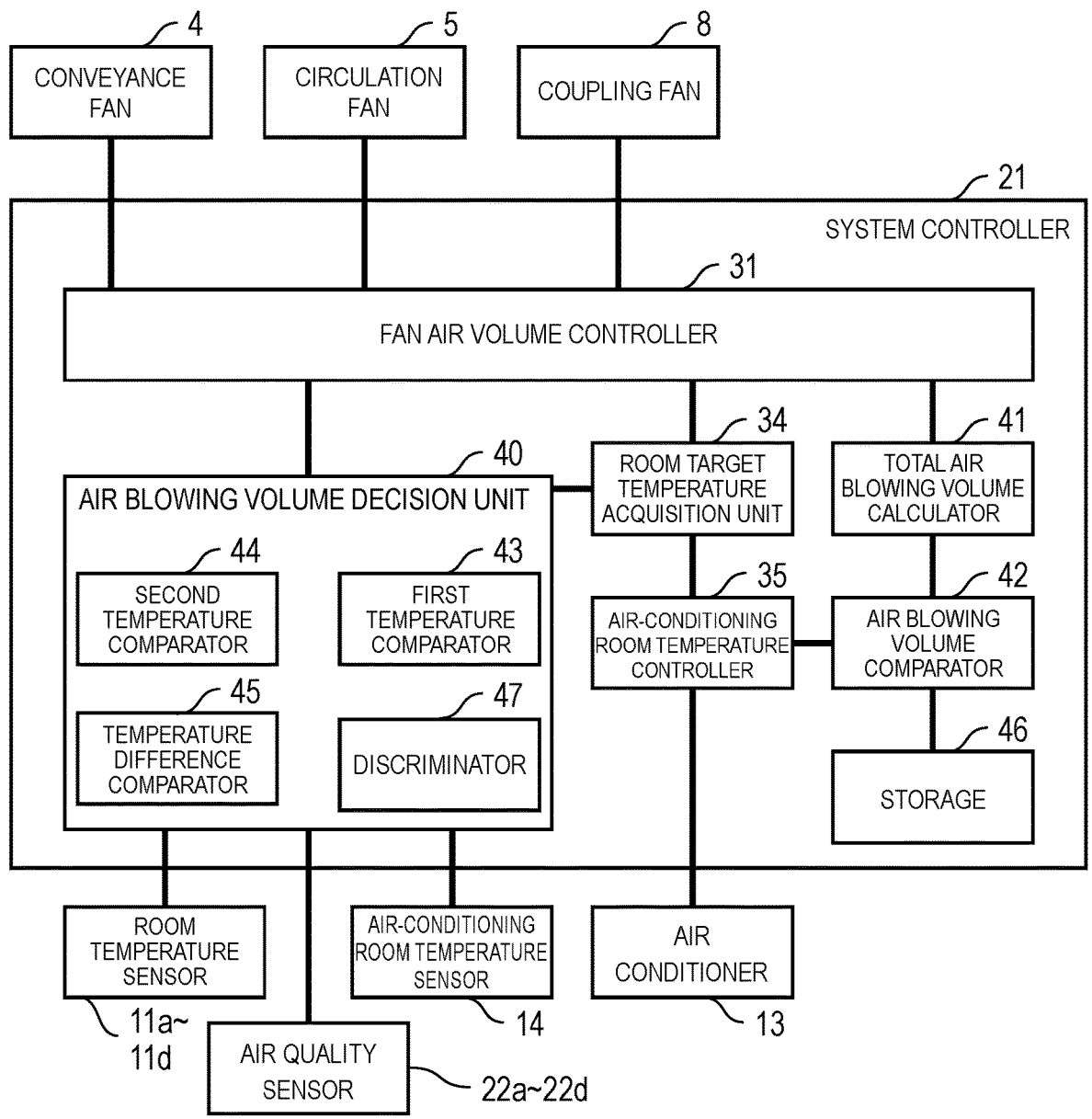
FIG. 3 is a schematic functional block diagram of a system controller of the air-conditioning system.

Next, functions of system controller 21 will be described with reference to FIG. 3. FIG. 3 is a schematic functional block diagram of system controller 21.

System controller 21 includes room target temperature acquisition unit 34, air-conditioning room temperature controller 35, air blowing volume decision unit 40, fan air volume controller 31, total air blowing volume calculator 41, air blowing volume comparator 42, and storage 46.

Room target temperature acquisition unit 34 acquires a plurality of room target temperatures set for each room 6 by input and output terminal 19.

Air-conditioning room temperature controller 35 controls air conditioner 13 as the air-conditioning apparatus such that the temperature of air-conditioning room 18 (air-conditioning room temperature) is less than or equal to the lowest temperature among the plurality of room target temperatures acquired by room target temperature acquisition unit 34 during a cooling period, that is, when the indoor temperature of the room (room indoor temperature) is high and air conditioner 13 performs a cooling operation. Air-conditioning room temperature controller 35 controls air conditioner 13 such that the temperature of air-conditioning room 18 becomes more than or equal to than the highest temperature among the plurality of room target temperatures acquired by room target temperature acquisition unit 34 during a heating period, that is, when the indoor temperature of the room is low and air conditioner 13 performs a heating operation.

Air blowing volume decision unit 40 includes first temperature comparator 43, second temperature comparator 44, and temperature difference comparator 45. Air blowing volume decision unit 40 decides the air blowing volumes of conveyance fans 4 based on the room target temperatures acquired by room target temperature acquisition unit 34, the temperature of air-conditioning room 18 controlled by air-conditioning room temperature controller 35, and the indoor temperatures of the rooms acquired by room temperature sensors 11. A procedure for deciding and changing the air blowing volumes will be described later.

First temperature comparator 43 calculates, for each room, a temperature difference between the room target temperature acquired by room target temperature acquisition unit 34 and the temperature of the air-conditioning room detected by air-conditioning room temperature sensor 14.

Second temperature comparator 44 calculates, for each room, a temperature difference between the room target temperature acquired by room target temperature acquisition unit 34 and the indoor temperature of the room detected by room temperature sensor 11.

Temperature difference comparator 45 compares temperature difference A calculated by second temperature comparator 44 at predetermined timing A with temperature difference B calculated by second temperature comparator 44 at timing B after a certain time has elapsed from predetermined timing A. Timing A can be referred to as a predetermined time, and timing B can be referred to as a time after a certain time has elapsed from the predetermined time.

Fan air volume controller 31 controls air volumes of the plurality of conveyance fans 4a to 4d provided corresponding to the plurality of upper rooms 2a to 2d to air blowing volumes of conveyance fans 4a to 4d decided by air blowing volume decision unit 40. Although fan air volume controller 31 may also control circulation fans 5a to 5d, detailed description thereof is omitted here.

Total air blowing volume calculator 41 calculates a total air blowing volume which is the sum of the air blowing volumes of the plurality of conveyance fans 4a to 4d. Here, the sum of the air blowing volumes is the sum of the air blowing volumes per unit time of conveyance fans 4a to 4d.

Air blowing volume comparator 42 compares the total air blowing volume calculated by total air blowing volume calculator 41 with a predetermined air blowing volume threshold. Here, the predetermined air blowing volume threshold may be, for example, the sum of maximum air blowing volumes of the plurality of conveyance fans 4a to 4d or a value of 70% to 95% of the sum of the maximum air blowing volumes.

Storage 46 is a so-called memory that stores a predetermined air blowing volume threshold set in advance. Storage 46 is also used when it is necessary to store information such as numerical values for control by system controller 21.

<Air-Conditioning Processing in Upper Rooms>

Figure 4:
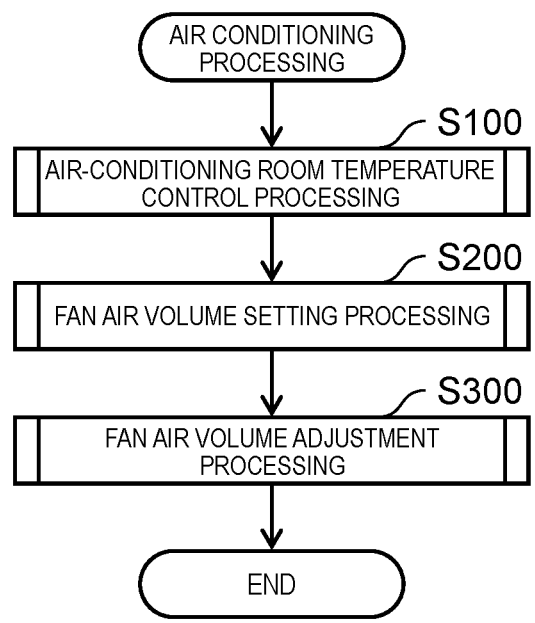
FIG. 4 is a flowchart illustrating air-conditioning processing.
Figure 5:
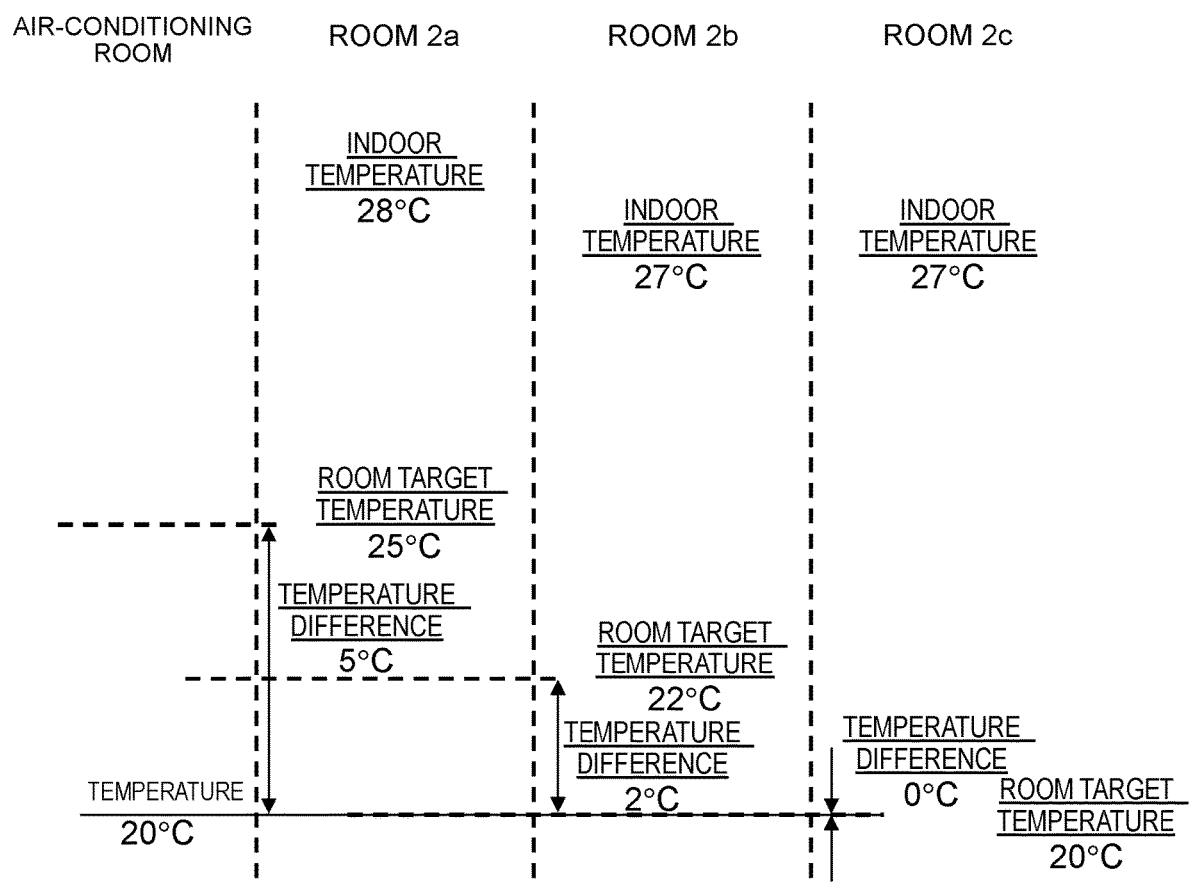
FIG. 5 is a diagram illustrating an example of a relationship between a temperature of an air-conditioning room, indoor temperatures of rooms, and room target temperatures.
Figure 6:
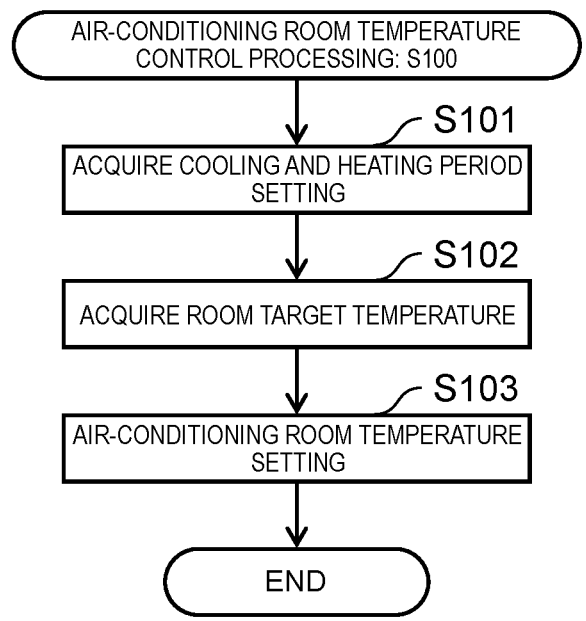
FIG. 6 is a flowchart illustrating air-conditioning room temperature control processing.
Figure 7:
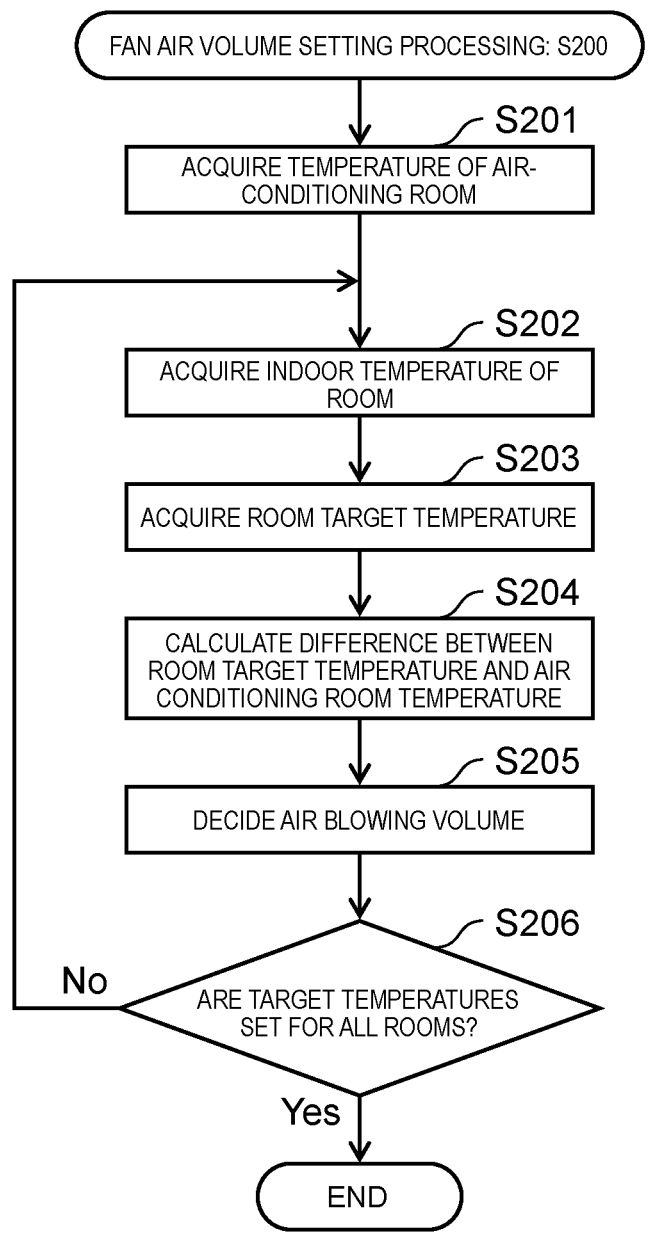
FIG. 7 is a flowchart illustrating fan air volume setting processing.
Figure 8:
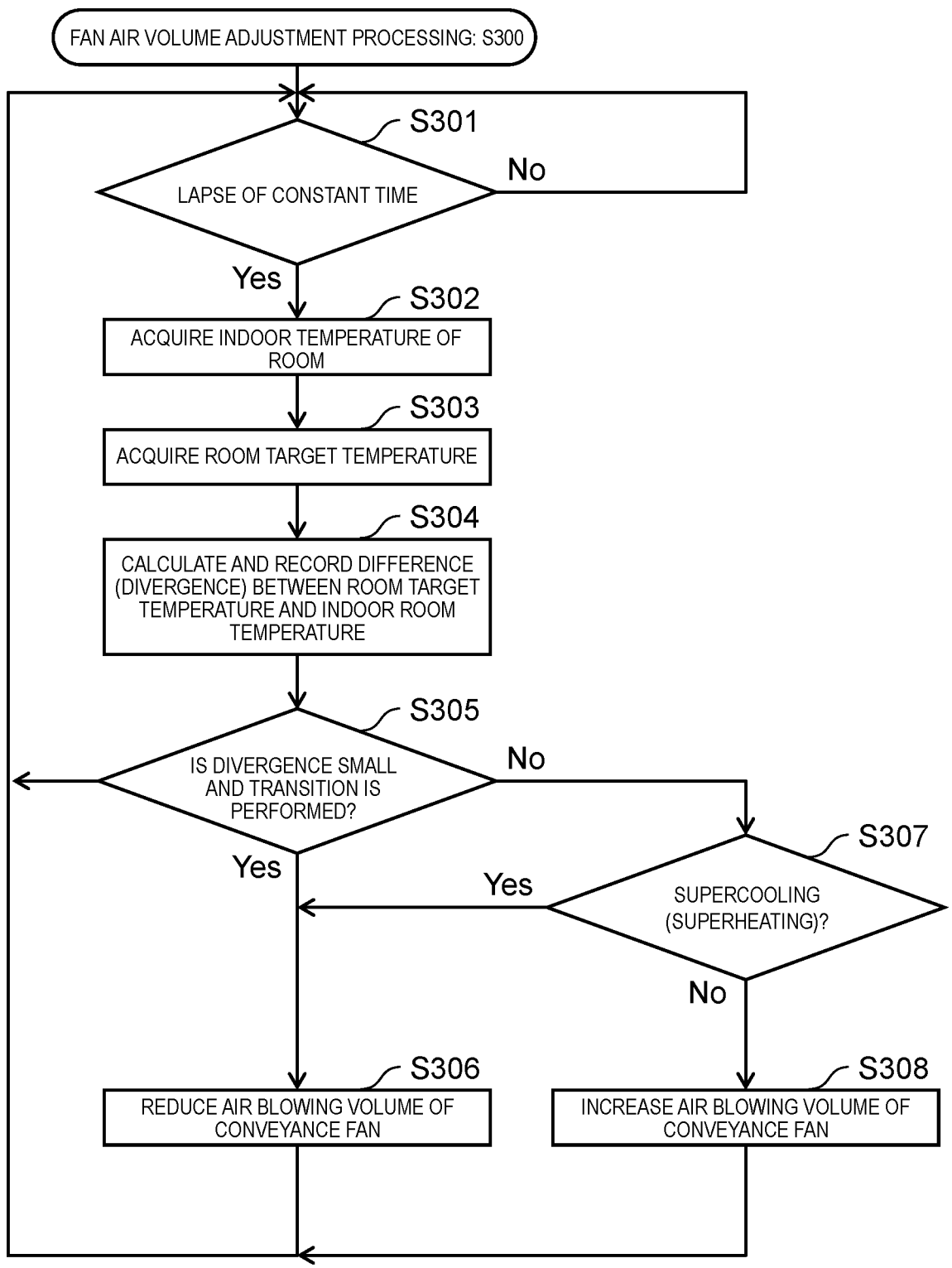
FIG. 8 is a flowchart illustrating fan air volume adjustment processing.
Figure 9:
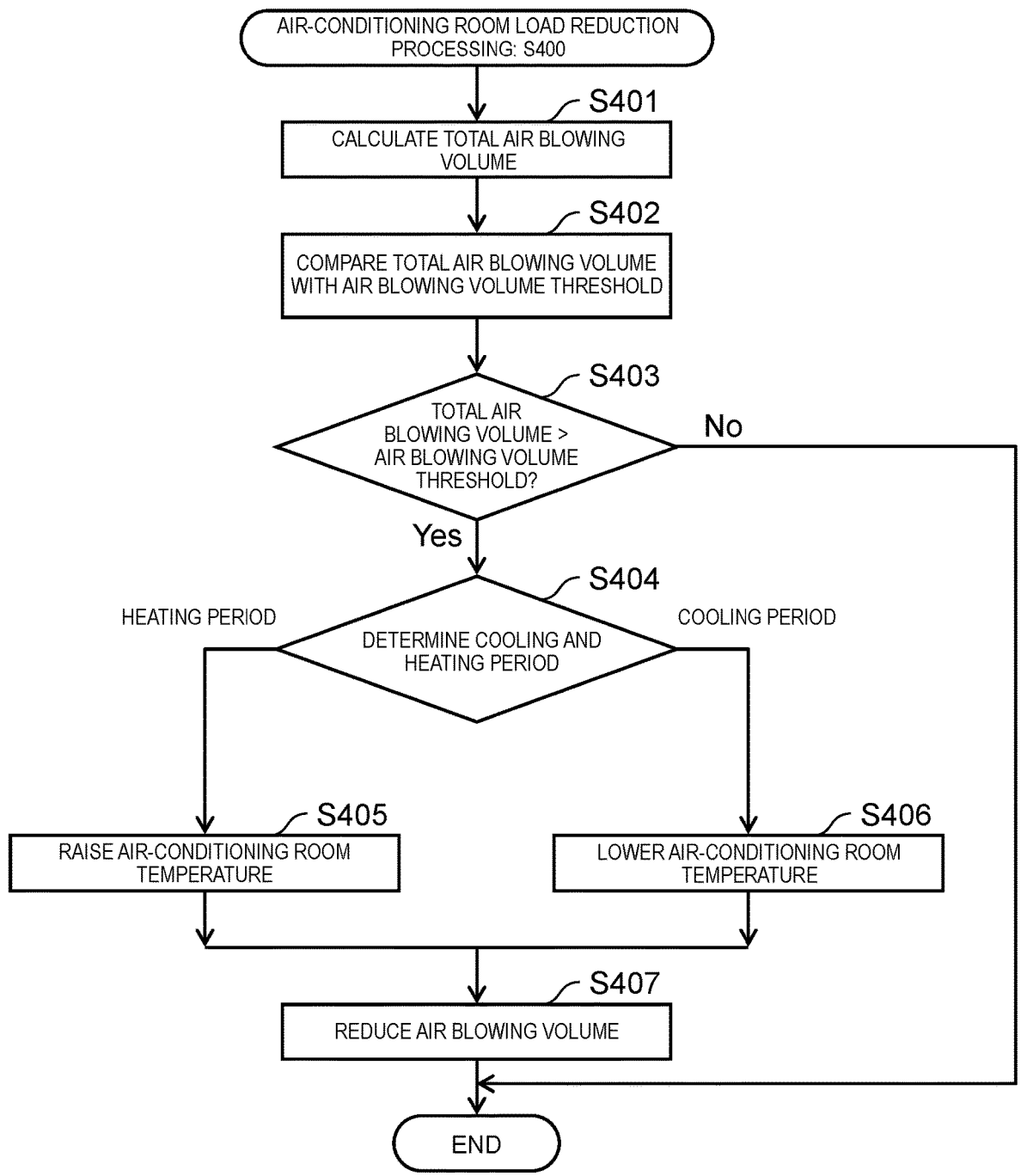
FIG. 9 is a flowchart illustrating air-conditioning room load reduction processing.

Next, air-conditioning processing related to the upper rooms executed by system controller 21 will be mainly described with reference to FIGS. 4 to 9. FIG. 4 is a flowchart illustrating the air-conditioning processing. FIG. 5 is a diagram illustrating an example of a relationship between the temperature of the air-conditioning room, the indoor temperature of the room, and the room target temperature. FIG. 6 is a flowchart illustrating air-conditioning room temperature control processing. FIG. 7 is a flowchart illustrating fan air volume setting processing FIG. 8 is a flowchart illustrating fan air volume adjustment processing. FIG. 9 is a flowchart illustrating air-conditioning room load reduction processing.

As shown in FIG. 4, the air-conditioning processing executed by system controller 21 mainly includes air-conditioning room temperature control processing S100, fan air volume setting processing S200, and fan air volume adjustment processing S300, and is executed in this order.

When the user executes the air-conditioning processing, system controller 21 first executes air-conditioning room temperature control processing S100 illustrated in FIG. 4. In air-conditioning room temperature control processing S100 illustrated in FIG. 6, system controller 21 acquires a cooling and heating period setting set by input and output terminal 19 (S101). Here, in the cooling and heating period setting, for example, a summer season in which air conditioner 13 is operated (activated) as a cooling apparatus due to a high temperature is set as the cooling period, and a winter season in which air conditioner 13 is operated as a heating apparatus due to a low temperature is set as the heating period. The user sets, for example, June to September as the cooling period and December to March as the heating period for a calendar function of input and output terminal 19, and thus, system controller 21 can acquire the setting.

Subsequently, system controller 21 acquires a plurality of room target temperatures set for respective rooms by input and output terminal 19 through room target temperature acquisition unit 34 (S102). However, since the control of upper rooms 2 is performed, only the room target temperatures of upper rooms 2 may be acquired.

After the room target temperatures are acquired, air-conditioning room temperature controller 35 sets the target temperature of air-conditioning room 18 (air-conditioning room target temperature) to air conditioner 13 (S103). Specifically, the air-conditioning room target temperature is decided as follows.

FIG. 5 illustrates temperature environments in air-conditioning room 18, upper room 2a, upper room 2b, and upper room 2c. Upper room 2a has an indoor temperature of 28° C. and a room target temperature of 25° C. Upper room 2b has an indoor temperature of 27° C. and a room target temperature of 22° C. Upper room 2c has an indoor temperature of 27° C. and a room target temperature of 20° C. It is assumed that upper room 2d has an indoor temperature of 27° C. and the room target temperature is not set. Here, since the cooling and heating period setting acquired in S101 is the cooling period, that is, the cooling operation, air-conditioning room temperature controller 35 controls the air-conditioning room target temperature to a temperature less than or equal to the lowest temperature among the plurality of room target temperatures. That is, in the example shown in FIG. 5, the plurality of room target temperatures is compared and is set to be less than or equal to 20° C. that is the lowest temperature. Here, it is assumed that the air-conditioning room target temperature is 20° C.

During the heating period, that is, during the heating operation, air-conditioning room temperature controller 35 controls the air-conditioning room target temperature to a temperature more than or equal to the highest temperature among the plurality of room target temperatures. Although not illustrated in FIG. 5, for example, the set temperature is 23° C. in the heating period.

With the above setting, air-conditioning room 18 is cooled to 20° C. that is the set temperature, and this air-conditioning room target temperature can correspond to the room target temperatures (here, 20° C. to 25° C.) of all upper rooms 2.

Next, system controller 21 executes fan air volume setting processing S200 illustrated in FIG. 7. In fan air volume setting processing S200, system controller 21 acquires the air-conditioning room temperature via air-conditioning room temperature sensor 14 (S201). Subsequently, system controller 21 acquires the room temperature of each upper room 2 via room temperature sensor 11 (S202). System controller 21 acquires the plurality of room target temperatures set for upper rooms 2a to 2d by input and output terminal 19 via room target temperature acquisition unit 34 (S203).

When the acquisition is completed, first temperature comparator 43 compares the room target temperature with the air-conditioning room temperature, and calculates the temperature difference (S204).

When first temperature comparator 43 calculates the temperature difference, air blowing volume decision unit 40 decides the air blowing volume of each of conveyance fans 4a to 4d based on the calculated temperature difference (S205).

The air blowing volume is specifically decided as follows. That is, since the room target temperature of upper room 2c is 20° C. and the temperature of air-conditioning room 18 for which the air-conditioning is controlled is 20° C., the air blowing volume of conveyance fan 4c corresponding to the conveyance duct that connecting upper room 2c and air-conditioning room 18 is set to a maximum value. Here, the air blowing volume can be air blowing capacity of the conveyance fan or an operation notch. For example, when the air blowing volumes of conveyance fans 4 can be set in 10 stages of air blowing volume 1 to air blowing volume 10 in ascending order of the air blowing volumes, air blowing volume 10 is decided here. That is, air blowing volume decision unit 40 decides the air in air-conditioning room 18 at the same temperature (20° C.) to be blown at the maximum volume in order to lower the indoor temperature of upper room 2c from 27° C. and further maintain the room target temperature of 20° C.

For example, since the room target temperature of upper room 2b is 22° C. and the temperature of the air-conditioning room 18 for which the air-conditioning is controlled is 20° C., when the air blowing capacity of conveyance fan 4b is set to air blowing volume 10 that is the maximum value, the room target temperature of upper room 2b may fall below 22° C. Thus, air blowing volume decision unit 40 sets the air blowing volume of conveyance fan 4b to a value lower than the maximum value. The low value is, for example, air blowing volume 8.

Similarly, since the room target temperature of upper room 2a is 25° C. and the temperature of the air-conditioning room 18 for which air-conditioning is controlled is 20° C., when the air blowing capacity of conveyance fan 4a is set to maximum air blowing volume 10, the room target temperature of upper room 2a may fall below 25° C. Thus, air blowing volume decision unit 40 sets the air blowing volume of conveyance fan 4a to, for example, air blowing volume 5 lower than the maximum value.

That is, air blowing volume decision unit 40 sets the air blowing volume of conveyance fan 4c to be larger in the room (upper room 2c: temperature difference 0° C.) in which the temperature difference calculated by first temperature comparator 43 is small than in the room (for example, upper room 2a: temperature difference 5° C., upper room 2b: temperature difference 2° C.) in which the temperature difference is large in accordance with a difference between the room target temperature and the temperature of the air-conditioning room, for example.

The above tasks of processing are performed on all the upper rooms including upper room 2d (No in S206→ S202 . . . →Yes in S206).

When air blowing volume decision unit 40 decides the air volume of each of conveyance fans 4, fan air volume controller 31 controls each of conveyance fans 4 according to the decision.

Accordingly, upper rooms 2 can be controlled to the room target temperatures by the temperature of air-conditioning room 18 controlled by air-conditioning room temperature controller 35 and the control of the plurality of independent conveyance fans 4a to 4d.

Regardless of the difference between the indoor temperature of the room and the room target temperature, the indoor temperature can quickly reach the room target temperature by first blowing the air at the maximum air volume to the upper room that has not reached the room target temperature. Even in this case, it is possible to maintain each room at the room target temperature by fan air volume adjustment processing S300 to be described later. However, since air-conditioning room 18 conveys the air to the plurality of upper rooms 2, when a large volume of air is conveyed at a time, cooling and heating processing of air-conditioning room 18 cannot catch up, that is, a cooling and heating effect deteriorates. This is, for example, a case where the processing of the air-conditioning system is started or a case where a family member returns to a residential building where the family member is absent and sets target setting temperatures of the rooms to be low all at once. In order to cope with these problems, a volume of the air-conditioning room may be increased, but since space cost increases due to the increase in the volume, the air-conditioning apparatus needs to have a large capacity. On the other hand, air blowing volume decision unit 40 sets the air blowing volume of the conveyance fan to be larger in the room in which the temperature difference is small than in the room in which the temperature difference is large. In other words, air blowing volume decision unit 40 sets the air blowing volume of the conveyance fan to be smaller in upper room 2 in which the temperature difference is large than in the upper room in which the temperature difference is small. Accordingly, since the indoor temperature of each upper room 2 is gradually lowered to the room target temperature, the deterioration in the cooling and heating effect is suppressed, and as a result, the size of the air-conditioning room is reduced.

Incidentally, in the above setting, for example, since the room target temperature of upper room 2c is 20° C. that is the same as the temperature of air-conditioning room 18, it is possible to control upper room 2c to the room target temperature by controlling conveyance fan 4c at the maximum air volume. However, for example, since the room target temperature of upper room 2a is 25° C., it is unclear whether or not the temperature of the upper room reaches, whether or not the temperature of the upper room reaches and can be maintained at the room target temperature, or whether or not supercooling occurs in air blowing volume 5 of the above example. The same applies to upper room 2b. In order to cope with such a situation, system controller 21 executes fan air volume adjustment processing S300 illustrated in FIG. 8. In fan air volume adjustment processing S300, system controller 21 determines whether or not a certain time has elapsed from the end of fan air volume setting processing S200 (S301). When the certain time has not elapsed, the processing waits until the certain time elapses (No in S301). This is because a time for operating the air-conditioning system in the environment set in fan air volume setting processing S200 to bring the indoor temperature of each upper room 2 close to the room target temperature.

When the certain time has elapsed, system controller 21 acquires the indoor temperatures of upper rooms 2 via room temperature sensors 11 (S302). System controller 21 acquires the plurality of room target temperatures set for upper rooms 2a to 2d by input and output terminal 19 via room target temperature acquisition unit 34 (S303).

When the acquisition is completed, second temperature comparator 44 compares the room target temperature with the indoor temperature of the room, and calculates the temperature difference (temperature divergence) (S304).

When second temperature comparator 44 calculates the temperature difference, temperature difference comparator 45 compares the temperature difference with temperature difference A calculated by the second temperature comparator at the previous timing (corresponding to timing A) stored in previous fan air volume adjustment processing S300. Since the current processing is first processing, and therefore there is no temperature difference A calculated in the previous processing, the temperature difference calculated without comparison is stored, as temperature difference A, in storage 46, and the processing returns to the processing of S301.

When there is temperature difference A calculated at the previous timing (timing A), temperature difference comparator 45 compares temperature difference B calculated by second temperature comparator 44 at the current timing (corresponding to timing B) with temperature difference A at timing A stored in storage 46.

Here, a case where the divergence of the indoor temperature of the room from the room target temperature decreases due to time transition from timing A to timing B, that is, a case where temperature difference B is smaller than temperature difference A means that the indoor temperature of the room is approaching the room target temperature by the operation of conveyance fan 4. Thus, air blowing volume decision unit 40 decreases the air blowing volume of conveyance fan 4 (Yes in S305→S306).

When there is no divergence of the indoor temperature of the upper room from the room target temperature due to the transition of the time from timing A to timing B or there is an increase thereof, that is, when temperature difference B is larger than temperature difference A, supercooling (in the cooling period) or superheating (in the heating period) is further determined (S307). That is, when the divergence increases, it is conceivable that the air blowing volume of conveyance fan 4 is too large and cooling (heating) exceeding the room target temperature is performed (overtreatment) and the air blowing volume of conveyance fan 4 is too small and does not approach the room target temperature and the indoor temperature of upper room 2 is away from the room target temperature due to the influence of the outside air. Thus, the supercooling or the superheating is determined in S307.

Here, when it is determined that the current state is the supercooling or the superheating, that is, the overtreatment, air blowing volume decision unit 40 decreases the air blowing volume of the conveyance fan (Yes in S307→S306).

When it is determined that the current state is not the supercooling or the superheating, that is, the overtreatment, air blowing volume decision unit 40 increases the air blowing volume of the conveyance fan (No in S307→S308).

Whether or not the current state is the supercooling (superheating) can be determined from the cooling and heating period setting, the room target temperature, and the indoor temperature of upper room 2.

Although not illustrated in FIG. 8, when there is no divergence due to the time transition from timing A to timing B, and the indoor temperature of the room is in a range close to the room target temperature (for example, plus or minus 0.3° C.), the air blowing volume of conveyance fan 4 may be maintained without being changed.

Fan air volume adjustment processing S300 described above is executed at each certain time.

According to fan air volume adjustment processing S300 described above, it is possible to maintain the room target temperature by causing each upper room 2 to reach the room target temperature by the temperature control of the air-conditioning room by air-conditioning room temperature controller 35 and the air blowing volume control of conveyance fan 4.

In particular, air of various temperatures flows into air-conditioning room 18 from the plurality of rooms by circulation fans 5 or the like, and thus, the temperature change is severe. Thus, since it is difficult to perform control in a system using an air pressure difference and a damper, it is important to blow the air using conveyance fans 4. In the above-described processing, although the temperature control can be performed even when a general fan is used as the conveyance fan, in order to enable fine temperature control, it is preferable to use, as the conveyance fan, a fan including an air volume constant control functional unit capable of maintaining a certain air blowing volume set without being affected by a duct length and a pressure.

When interruption processing is performed with a change of the setting of each room target temperature or processing of switching between the cooling and heating periods as the interruption processing, the air-conditioning processing can cope with the setting change by starting from air-conditioning temperature control processing S100.

Incidentally, air-conditioning room 18 is a space having a limited volume, and it is difficult to maintain the temperature of air-conditioning room 18 when it is necessary to cool or heat all upper rooms 2a to 2d at maximum air blowing volume 10, for example. This is because a large volume of air of which the temperature is controlled flows out from air-conditioning room 18, and conversely, a large volume of air having in which a temperature difference is larger than the set temperature of air-conditioning room 18 flows in.

Accordingly, in order to cope with such a situation, system controller 21 may execute air-conditioning room load reduction processing S400 illustrated in FIG. 9. In air-conditioning room load reduction processing S400, total air blowing volume calculator 41 calculates the total air blowing volume that is the sum of the air blowing volumes of the plurality of conveyance fans 4a to 4d (S401). Subsequently, air blowing volume comparator 42 compares the total air blowing volume calculated by total air blowing volume calculator 41 with a predetermined air blowing volume threshold stored in advance in storage 46 (S402). Here, the predetermined air blowing volume threshold is a value of 80% of the sum of the maximum air blowing volumes of the plurality of conveyance fans 4a to 4d.

Here, when the total air blowing volume exceeds the predetermined air blowing volume threshold (Yes in S403), air blowing volume comparator 42 further acquires the cooling and heating period setting set by input and output terminal 19, and determines the cooling and heating periods based on this information (S404). Air blowing volume comparator 42 transmits, to air-conditioning room temperature controller 35, information indicating that the total air blowing volume exceeds the predetermined air blowing volume threshold and information indicating that the current period is the cooling period or the heating period. When the total air blowing volume is less than or equal to the predetermined air blowing volume threshold (No in S403), the processing is ended.

When the information indicating that the total air blowing volume exceeds the predetermined air blowing volume threshold and the information indicating that the current period is the cooling period or the heating period is received, air-conditioning room temperature controller 35 changes the air-conditioning room temperature to be lower from the current setting in the cooling period (cooling period in S404→S406). In the heating period, air-conditioning room temperature controller 35 changes the current setting of the air-conditioning room temperature to be higher from the current setting (heating period in S404→S405).

Air-conditioning room temperature controller 35 transmits information indicating that the setting of the air-conditioning room temperature is changed to air blowing volume decision unit 40, and air blowing volume decision unit 40 decreases the air blowing volume of conveyance fan 4 based on this information (S407).

Accordingly, the setting of the temperature of air-conditioning room 18 is changed to be lower (cooling period) or higher (heating period), and thus, it is possible to cope with a wide temperature range of the room target temperature without increasing the limited volume of air-conditioning room 18.

When a decreasing range (cooling period) and an increasing range (heating period) of the air-conditioning room temperature are not fixed values, but are increased in proportion to the volume by which the total air blowing volume exceeds the predetermined air blowing volume threshold, it is advantageous in terms of utilization efficiency and energy consumption of air-conditioning room 18. Specifically, when the predetermined air blowing volume threshold is 70 and the total air blowing volume is 80, the temperature is changed by 2° C. Similarly, when the total air blowing volume is 90, the temperature is changed by 4° C., and when the total air blowing volume is 100, the temperature is changed by 6° C.

Air blowing volume decision unit 40 may include discriminator 47 that divides the rooms into an out-of-reference-value room in which the air quality acquired via air quality sensor 22 exceeds a predetermined reference value and a within-reference-value room in which the predetermined reference value is within the predetermined reference value. Air blowing volume decision unit 40 decides the air blowing volume of conveyance fan 4 such that the air blowing volume to the within-reference-value room is larger than the air blowing volume to the out-of-reference-value room. Accordingly, the within-reference-value room is in a pressurized state, and thus, it is possible to suppress inflow of so-called harmful substances that may adversely affect the human body when the air blowing volume is more than or equal to the reference value from the out-of-reference-value room to the within-reference-value room.

Air blowing volume decision unit 40 decides that coupling fan 8 belonging to the out-of-reference-value room is to stop or blow air at a minimum notch. Accordingly, it is possible to suppress outflow of harmful substances from the inside of the out-of-reference-value room.

The above description is the air-conditioning processing for upper rooms 2 using conveyance fans 4.

<Air Conditioning Processing in Lower Rooms>

Next, air-conditioning processing regarding the lower rooms executed by system controller 21 will be described with reference to FIGS. 1 and 3. In the above-described processing, the air-conditioning processing for lower rooms 3 is executed while the air-conditioning of upper rooms 2 is completed and the indoor temperature reaches the room target temperature or the air-conditioning of upper rooms 2 is being executed.

It is assumed that system controller 21 stores a relationship between upper rooms 2 and lower rooms 3 in storage 46 in advance. Specifically, storage 46 stores information indicating that coupling fan 8a couples upper room 2a and lower room 3a, coupling fan 8b couples upper room 2b and lower room 3b, and coupling fan 8c and coupling fan 8d couple upper room 2c and upper room 2d and lower room 3c so as to be able to blow air. The input for the storage is performed via, for example, input and output terminal 19.

In the air-conditioning for lower rooms 3, system controller 21 acquires a plurality of room target temperatures set for each lower room 3 by input and output terminal 19 via room target temperature acquisition unit 34.

Subsequently, system controller 21 acquires the indoor temperatures of upper rooms 2a to 2d and lower rooms 3a to 3c via room temperature sensors 11.

Here, when system controller 21 determines that the indoor temperatures of lower rooms 3 approach the room target temperatures of lower rooms 3 by blowing the air in upper rooms 2 to lower rooms 3 positioned immediately below upper rooms 2, the system controller operates coupling fans 8 provided in upper rooms 2.

Specifically, for example, in the cooling period, it is assumed that the indoor temperature of upper room 2c is 20° C., the indoor temperature of upper room 2d is 27° C. since the upper room is not air-conditioned, the indoor temperature of lower room 3c is 27° C., and the room target temperature of lower room 3c is 24° C. In this case, system controller 21 determines that the current indoor temperature of 27° C. can approach the room target temperature of 24° C. of lower room 3c by blowing the air of 20° C. in upper room 2c to lower room 3c. System controller 21 operates coupling fan 8c that couples upper room 2c and lower room 3c.

Accordingly, the indoor temperature of lower room 3c approaches and reaches the room target temperature. Air blowing volume decision unit 40 constituting system controller 21 can decide the air volume of coupling fan 8c when coupling fan 8c is operated. A decision procedure may be similar to the air-conditioning processing of the upper rooms described above. That is, in the air-conditioning processing of lower rooms 3, upper room 2 corresponding to lower room 3 is regarded as an air-conditioning room, and air is blown from upper room 2 regarded as the air-conditioning room to lower room 3. When the air volume of coupling fan 8 is decided, fan air volume controller 31 operates coupling fan 8 with the decided air volume.

According to the above processing, the air-conditioning processing of the lower room is performed, and the indoor temperature of lower room 3 can be controlled without routing the duct for a long distance although being affected by the range of the room temperature of the upper room. That is, it is possible to efficiently blow the air between the upper floor and the lower floor. Such an air-conditioning system is particularly effective in that the common parts can be used in the above-described unit method.

<Configuration of Coupling Fan>

Figure 10A:
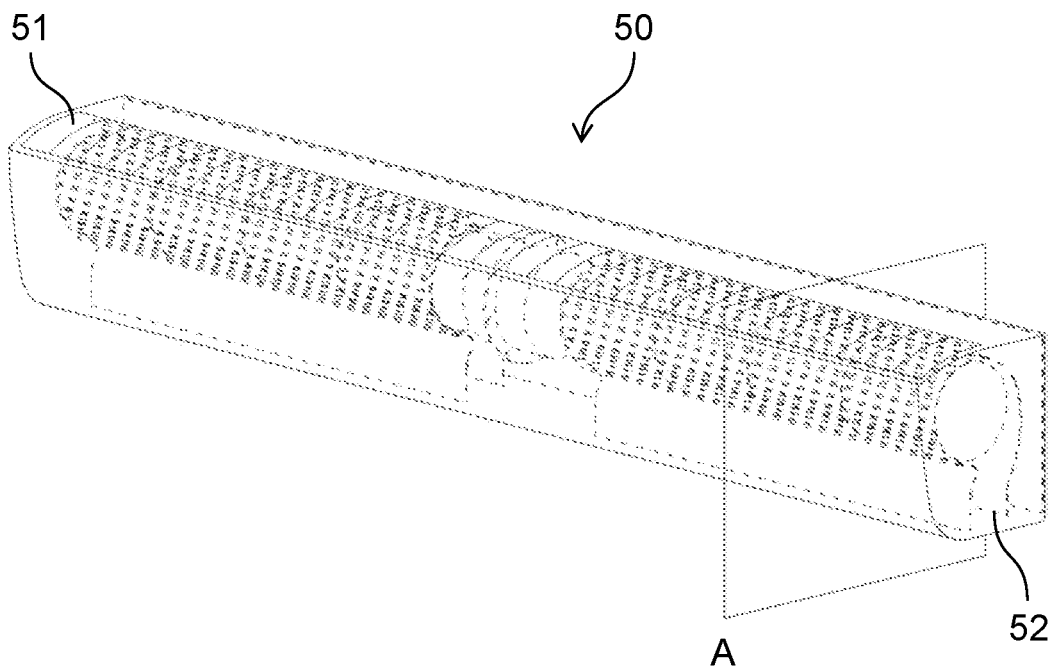
FIG. 10A is a diagram illustrating an example of a cross-flow fan of an upper surface suction lower surface blow type.
Figure 10B:
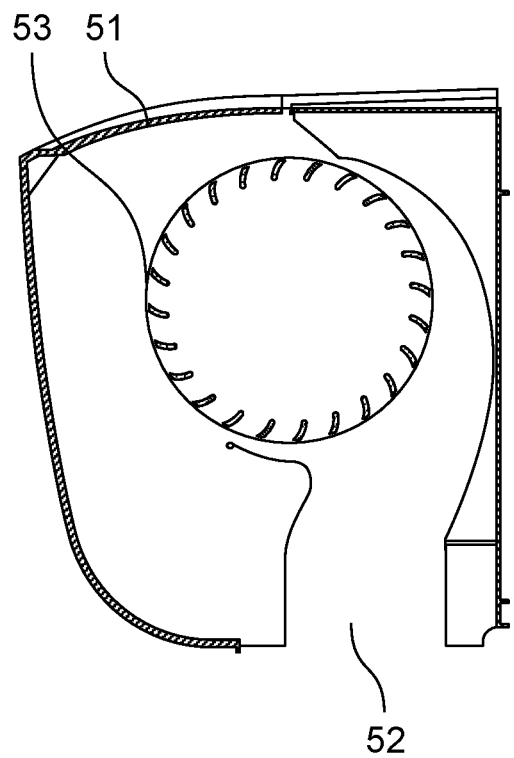
FIG. 10B is a cross-sectional view in A-plane of FIG. 10A.

As coupling fan 8, a normal propeller fan can be used, but a cross-flow fan of an upper surface suction lower surface blow type is preferably used. Specifically, as illustrated in FIGS. 10A and 10B, cross-flow fan 50 includes suction port 51 on an upper surface, blowout port 52 on a lower surface, and cylindrical impeller 53 having a large number of blades curved in a rotation direction that guides air from suction port 51 to blowout port 52.

Since cross-flow fan 50 can achieve a low noise and a large air volume by lengthening a long side, it is possible to blow the air to lower room 3 with a large air volume without disturbing and standing out by arranging the long side in parallel along a wall that is the floor surface of upper room 2.

Modification Example

Although the air-conditioning system and the system controller according to the present invention have been described above, the above exemplary embodiment is merely an example, and the present invention is not limited thereto.

For example, circulation fans 5a to 5d and conveyance fans 4a to 4d communicate with each other by ducts connecting upper rooms 2 and air-conditioning room 18. However, circulation fans 5a to 5d are not necessarily connected by the ducts, and a space such as a corridor connecting the rooms can be regarded as the duct. In this case, the air in the rooms is conveyed from the rooms to the corridor by air blowing fans 10. The air in the rooms conveyed to the corridor is taken into air-conditioning room 18 that is communicatively connected with the corridor. The intake into air-conditioning room 18 is performed by newly providing the circulation fan on the wall surface of air-conditioning room 18 facing the corridor, or may be performed by setting the air-conditioning room to be a negative pressure without using the circulation fan. Such a configuration can also contribute to the air-conditioning system, although it is expected that circulation efficiency is lowered while the connection is performed by the duct.

In the above exemplary embodiment, the room is used, but the room may not have a person, and can be regarded as one space. That is, when the corridor and the kitchen are also partitioned to some extent, the corridor and the kitchen can be regarded as one space, and correspond to one room.

Although air-conditioning room 18 is provided in the attic in the above-described exemplary embodiment, air-conditioning room 18 may be provided on the second floor, that is, the upper floor.

The house is not limited to a two-storied building. For example, when the house is a three-storied building, the third floor corresponds to an upper floor, and the second floor and the first floor correspond to lower floors.

In the above exemplary embodiment, the temperature control is described, but the temperature control may be used for the humidity control.

INDUSTRIAL APPLICABILITY

Since the air-conditioning system according to the present invention can efficiently blow the air between the upper floor and the lower floor, the air-conditioning system is useful as the whole building air-conditioning of the house adopting a so-called unit method.

REFERENCE MARKS IN THE DRAWINGS

1: house
2,2a,2b,2c,2d: upper room
3,3a,3b,3c: lower room
4,4a,4b,4c,4d: conveyance fan
5,5a,5b,5c,5d: circulation fan
7: outside air introduction fan
8,8a,8b,8c,8d: coupling fan
9,9a,9b,9c,9d: discharge fan
10,10a,10b,10c: air blowing fan
11, 11a, 11b, 11c, 11d, 11e, 11f, 11g: room temperature sensor
12,12a,12b,12c,12d,12e,12f,12g: room humidity sensor
13: air conditioner
14: air-conditioning room temperature sensor
15: air-conditioning room humidity sensor
16: humidifier
17: dehumidifier
18: air-conditioning room
19: input and output terminal
20: air-conditioning system
21: system controller
22,22a,22b,22c,22d,22e,22f,22g: air quality sensor
31: fan air volume controller
34: room target temperature acquisition unit
35: air-conditioning room temperature controller
40: air blowing volume decision unit
41: total air blowing volume calculator
42: air blowing volume comparator
43: first temperature comparator
44: second temperature comparator
45: temperature difference comparator
46: storage
47: discriminator

The invention claimed is:

1. An air-conditioning system that air-conditions a house having an upper floor and a lower floor positioned at a lower position than the upper floor, the air-conditioning system comprising:
an air-conditioner that conditions air in an air-conditioning room provided at the upper floor or at a higher position than the upper floor;
a plurality of conveyance fans that convey the air in the air-conditioning room to a plurality of upper rooms positioned at the higher floor independent of the air-conditioning room, and is provided to correspond to the plurality of upper rooms;
coupling fans that couple the plurality of upper rooms and a plurality of lower rooms positioned at a lower position of the plurality of upper rooms to blow air from the plurality of upper rooms to the plurality of lower rooms;
a system controller that controls the air-conditioner, the conveyance fans, and the coupling fans; and
upper-floor air blowing fans that connect the plurality of upper rooms adjacent to each other to allow air flow, and is controlled from the system controller.

2. The air-conditioning system according to claim 1, wherein the conveyance fans do not convey the air in the air-conditioning room to the plurality of lower rooms.

3. The air-conditioning system according to claim 1, wherein the coupling fans blow the air in the plurality of upper rooms to the plurality of lower rooms positioned immediately below the plurality of upper rooms via floor surfaces of the plurality of upper rooms.

4. The air-conditioning system according to claim 1, further comprising a lower-floor air blowing fan that connects the plurality of lower rooms adjacent to each other to allow air flow, and is controlled by the system controller.

5. An air-conditioning system that air-conditions a house having an upper floor and a lower floor positioned at a lower position than the upper floor, the air-conditioning system comprising:
an air-conditioner that conditions air in an air-conditioning room provided at the upper floor or at a higher position than the upper floor;
a plurality of conveyance fans that conveys the air in the air-conditioning room to a plurality of upper rooms positioned at the higher floor independent of the air condition room, and is provided to correspond to the plurality of upper rooms;
coupling fans that couple the plurality of upper rooms and a plurality of lower rooms positioned at a lower position of the plurality of upper rooms to blow air from the plurality of upper rooms to the plurality of lower rooms;
a system controller that controls the air-conditioner, the conveyance fans, and the coupling fans;
room temperature sensors that acquire indoor temperatures of the plurality of upper rooms and the plurality of lower rooms, respectively, and transmit the acquired indoor temperatures to the system controller; and
an air-conditioning room temperature sensor that acquires a temperature of the air-conditioning room, and transmits the acquired temperature to the system controller,
wherein the system controller includes
a room target temperature acquisition unit that acquires a plurality of room target temperatures set for the plurality of upper rooms and the plurality of lower rooms,
an air-conditioning room temperature controller that controls the temperature of the air-conditioning room to be a temperature less than or equal to a lowest temperature of the plurality of room target temperatures when the air-conditioner is in a cooling operation, and controls the temperature of the air-conditioning room to be a temperature more than or equal to a highest temperature of the plurality of target temperatures when the air-conditioner is in a heating operation,
an air blowing volume decision unit that decides at least air blowing volumes of the plurality of conveyance fans based on the room target temperatures acquired by the room target temperature acquisition unit, the indoor temperatures of the rooms acquired by the room temperature sensors, and the temperature of the air-conditioning room controlled by the air-conditioning room temperature controller, and a fan air volume controller that controls the air blowing volumes of the plurality of conveyance fans with the air blowing volumes decided by the air blowing volume decision unit.

6. The air-conditioning system according to claim 5, wherein the air blowing volume decision unit decides air blowing volumes of the coupling fans based on room target temperatures of the plurality of lower rooms and room target temperatures of the plurality of upper rooms, and the fan air volume controller controls the air blowing volumes of the coupling fans with the air blowing volumes of the coupling fans decided by the air blowing volume decision unit.

7. An air-conditioning system that air-conditions a house having an upper floor and a lower floor positioned at a lower position than the upper floor, the air-conditioning system comprising:

an air-conditioner that conditions air in an air-conditioning room provided at the upper floor or at a higher position than the upper floor;

a plurality of conveyance fans that conveys the air in the air-conditioning room to a plurality of upper rooms positioned at the higher floor independent of the air condition room, and is provided to correspond to the plurality of upper rooms;

coupling fans that couple the plurality of upper rooms and a plurality of lower rooms positioned at a lower position of the plurality of upper rooms to blow air from the plurality of upper rooms to the plurality of lower rooms;

a system controller that controls the air-conditioner, the conveyance fans, and the coupling fans;

an air quality sensor that acquires air qualities of the plurality of upper rooms and the plurality of lower rooms, and transmits the acquired air qualities to the system controller; and an air blowing volume decision unit that is provided in the system controller, and decides air blowing volumes of the plurality of conveyance fans, wherein the air blowing volume decision unit includes a discriminator that divides the rooms into an out-of-reference-value room of which the air quality acquired via the air quality sensor exceeds a predetermined reference value and a within-reference-value room of which the predetermined reference value is within the predetermined reference value, and decides the air blowing volumes of the plurality of conveyance fans to cause the air blowing volume to the within-reference-value room to be larger than the air blowing volume to the out-of-reference-value room.

8. The air-conditioning system according to claim 7, wherein the air blowing volume decision unit decides to stop a coupling fan belonging to the out-of-reference-value room among the coupling fans or to blow the air at a minimum notch.

* * * * *